US012706495B2

(12) United States Patent
Minemura et al.

(10) Patent No.: US 12,706,495 B2
(45) Date of Patent: Aug. 11, 2026

(54) ELECTRIC PUMP ROTOR

(71) Applicant: AISIN CORPORATION, Kariya (JP)

(72) Inventors: Yuji Minemura, Kariya (JP); Shuji Hattori, Kariya (JP); Feng Li, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 19/258,542

(22) Filed: Jul. 2, 2025

(65) Prior Publication Data

US 2026/0025032 A1 Jan. 22, 2026

(30) Foreign Application Priority Data

Jul. 16, 2024 (JP) ................................ 2024-113461

(51) Int. Cl.
*H02K 1/278* (2022.01)

(52) U.S. Cl.
CPC .................................... *H02K 1/278* (2013.01)

(58) Field of Classification Search
CPC ...... F04D 13/06; F04D 25/06; F04D 25/0606; H02K 15/12; H02K 15/121; H02K 15/142; H02K 1/278; H02K 1/02; H02K 1/28
See application file for complete search history.

(56) References Cited

U.S. PATENT DOCUMENTS

2006/0273679 A1* 12/2006 Iwase ..................... H02K 1/276 310/43
2007/0018521 A1* 1/2007 Ishiguro ................ F04D 29/043 310/156.43
2013/0071247 A1* 3/2013 Ishiguro .................. F04D 29/30 416/223 R
2014/0271279 A1* 9/2014 Kuba .................. F04D 13/0606 417/420
2015/0369248 A1* 12/2015 Noguchi ............... F04D 13/064 417/420
2017/0009778 A1* 1/2017 Ye ............................ H02K 5/18

FOREIGN PATENT DOCUMENTS

JP 2008-008187 A 1/2008

* cited by examiner

*Primary Examiner* — Bryan M Lettman
(74) *Attorney, Agent, or Firm* — Oliff PLC

(57) ABSTRACT

An electric pump rotor includes: a permanent magnet; a cylindrical rotor core that holds the permanent magnet; an adjacent member that is provided adjacent to one side in an axial direction of the permanent magnet and the rotor core; and a resin molded portion in which a drive unit that covers the permanent magnet, the rotor core, and the adjacent member, and a blade portion that pressure-feeds a working fluid are integrally formed by resin molding.

6 Claims, 7 Drawing Sheets

OTHER SIDE
AXIAL DIRECTION
ONE SIDE
RADIAL INNER SIDE
RADIAL OUTER SIDE
CIRCUMFERENTIAL DIRECTION
100
42
42b
42a
43
102
41
20
C
41a
E
H1
30
35
50a
D
Ax
33
34
31
32
H2
101
50

Figure 7:
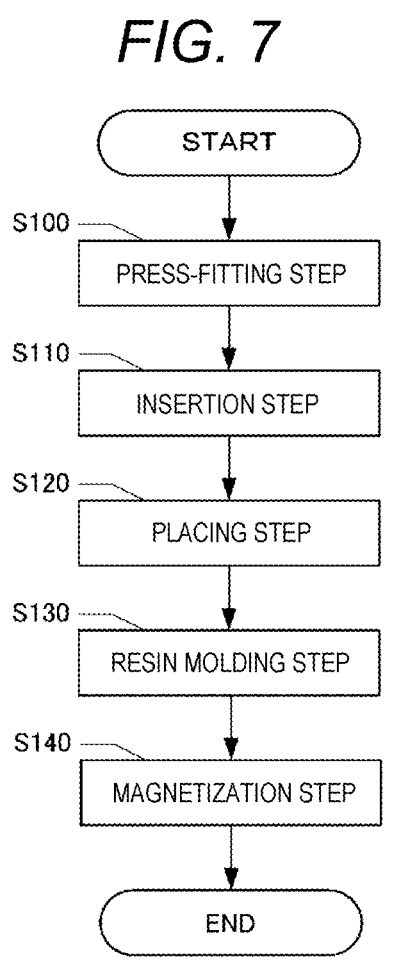

START
S100 PRESS-FITTING STEP
S110 INSERTION STEP
S120 PLACING STEP
S130 RESIN MOLDING STEP
S140 MAGNETIZATION STEP
END

ELECTRIC PUMP ROTOR

CROSS REFERENCE TO RELATED APPLICATIONS

This application is based on and claims priority under 35 U.S.C. § 119 to Japanese Patent Application 2024-113461, filed on Jul. 16, 2024, the entire content of which is incorporated herein by reference.

TECHNICAL FIELD

This disclosure relates to an electric pump rotor.

BACKGROUND DISCUSSION

In the related art, there is known a technique for forming, in an electric pump rotor, a drive unit that covers a permanent magnet and a rotor core and a blade portion that pressure-feeds a working fluid by resin molding to prevent the working fluid from entering an inside of the drive unit. For example, JP 2008-8187A (Reference 1) discloses a technique in which a primary molded portion 10 formed by resin molding and a secondary molded portion 20 joined to the primary molded portion 10 so as to cover a permanent magnet 3c and a core 3d and formed by resin molding using the same material as the primary molded portion 10 are provided in a drive unit 3a of a rotor 3, and annular protrusion portions 12 to 15 protruding toward the secondary molded portion 20 are provided in a joint portion 10a of the primary molded portion 10 with the secondary molded portion 20 (paragraphs 0018 and 0019, FIGS. 2 and 3). The vicinity of tip end portions of the annular protrusion portions of the primary molded portion 10 is melted by heat and pressure related to the resin molding of the secondary molded portion, and the primary molded portion and the secondary molded portion are welded to each other when the resin is solidified. Accordingly, the joint portion between the primary molded portion and the secondary molded portion is sealed, and the working fluid is prevented from entering an inside of the drive unit 3a (paragraph 0019).

In the related art, it is necessary to mold the secondary molded portion after the primary molded portion is molded, and the resin molding is performed in two steps, which is a factor that hinders improvement in productivity.

A need thus exists for an electric pump rotor which is not susceptible to the drawback mentioned above.

SUMMARY

According to an aspect of this disclosure, an electric pump rotor includes: a permanent magnet; a cylindrical rotor core that holds the permanent magnet; an adjacent member that is provided adjacent to one side in an axial direction of the permanent magnet and the rotor core; and a resin molded portion in which a drive unit that covers the permanent magnet, the rotor core, and the adjacent member, and a blade portion that pressure-feeds a working fluid are integrally formed by resin molding. The adjacent member includes a closed surface portion that includes a closed portion that closes the other side in the axial direction of an entire circumference hole portion formed over an entire circumference in a circumferential direction at an end portion of the drive unit on the one side in the axial direction, an inner extending portion that extends toward a radial inner side continuously from the closed portion, and an outer extending portion that extends toward a radial outer side continuously from the closed portion, and a first entire circumference protrusion portion that is formed over the entire circumference in the circumferential direction toward the one side in the axial direction at each of the inner extending portion and the outer extending portion, and is welded to the resin molded portion.

BRIEF DESCRIPTION OF THE DRAWINGS

The foregoing and additional features and characteristics of this disclosure will become more apparent from the following detailed description considered with the reference to the accompanying drawings, wherein:

FIG. 7 is a flowchart showing a method of manufacturing the electric pump rotor.

DETAILED DESCRIPTION

Here, an embodiment disclosed here will be described in accordance with the following order.

(1) Overall Configuration of Electric Pump:

(2) Detailed Configuration of Rotor:

(3) Method for Manufacturing Rotor:

(4) Other Embodiments:

(1) OVERALL CONFIGURATION OF ELECTRIC PUMP

Figure 1A:
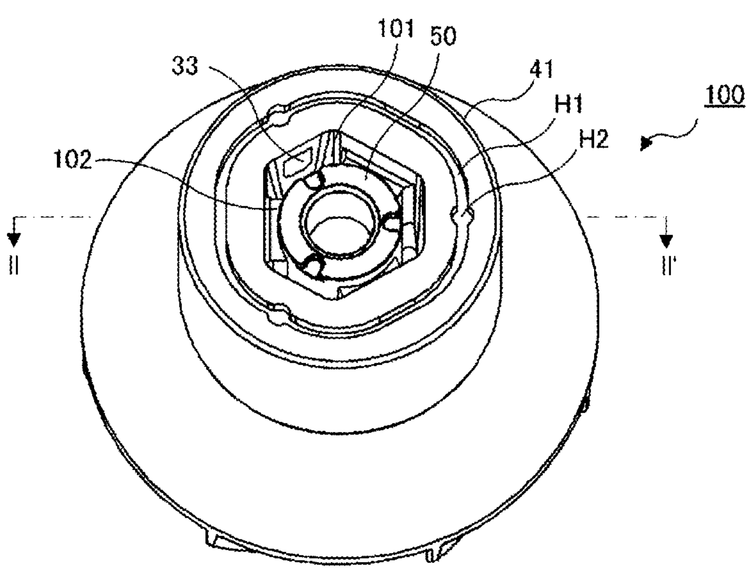
FIGS. 1A and 1B are perspective views of an electric pump rotor.
Figure 1B:
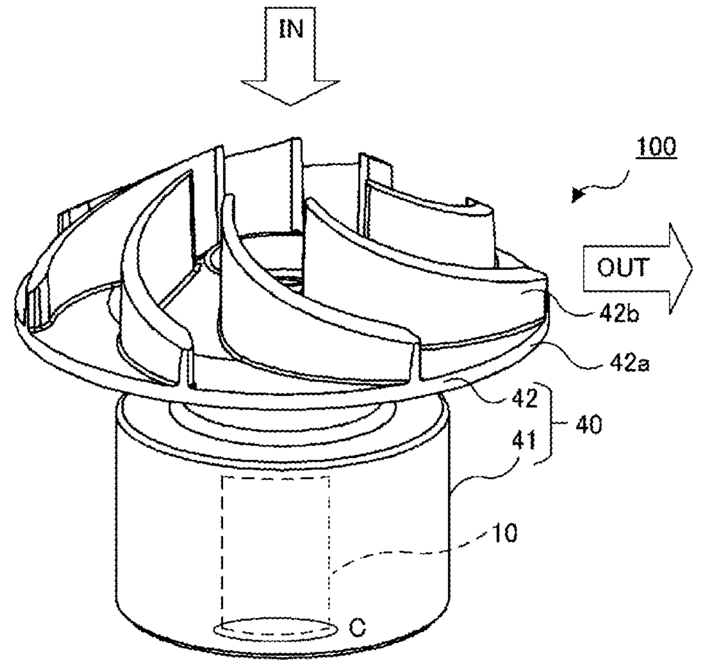
Figure 2:
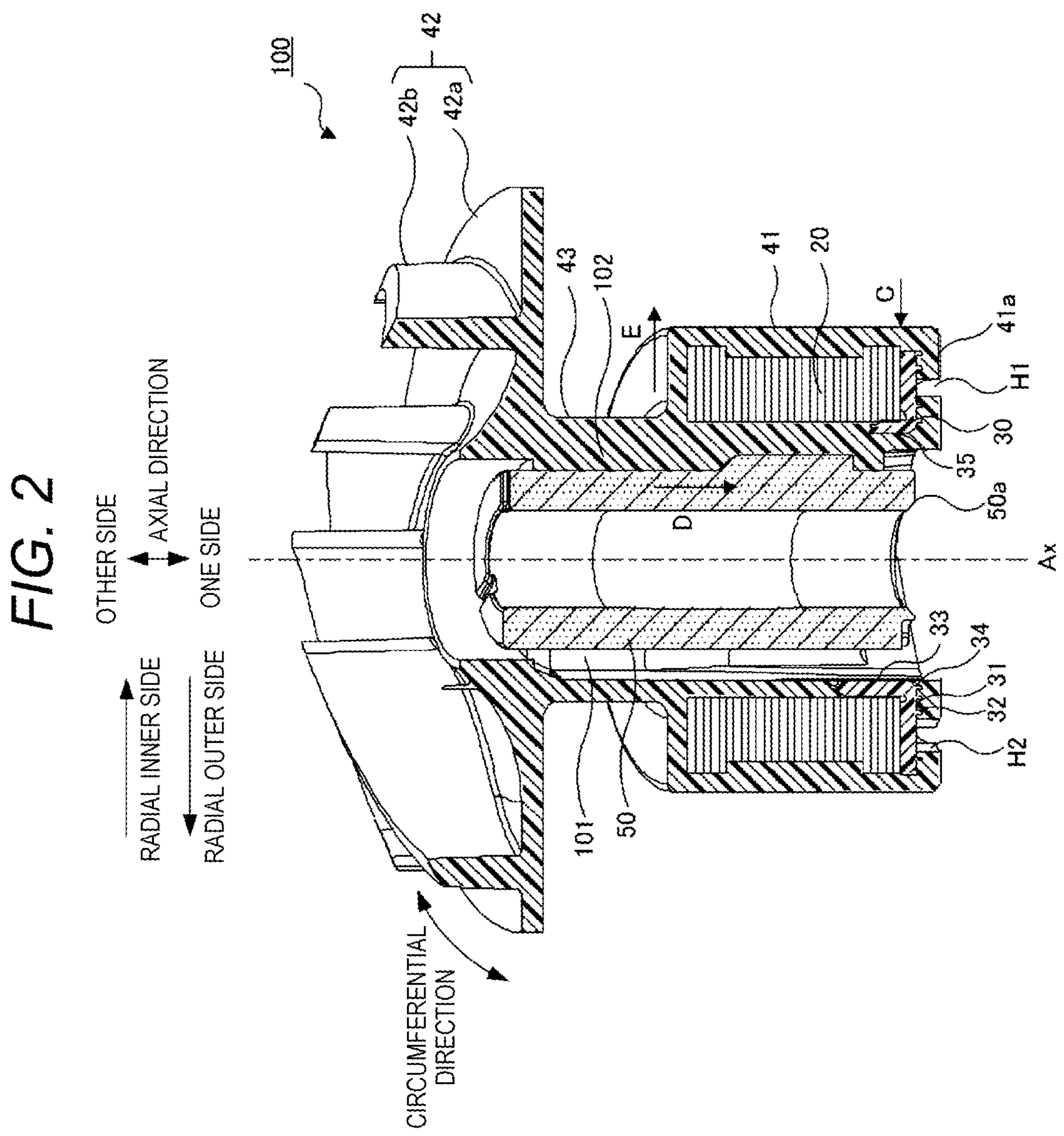
FIG. 2 is a perspective cross-sectional view of the electric pump rotor taken along a line II-II'.

FIG. 1A is a perspective view of an electric pump rotor according to the present embodiment when viewed from one side in an axial direction, and FIG. 1B is a perspective view of the electric pump rotor according to the present embodiment when viewed from the other side in the axial direction. FIG. 2 is a perspective cross-sectional view of the electric pump rotor according to the present embodiment taken along a line II-II'. An electric pump according to the present embodiment is, for example, an electric water pump that pressure-feeds a working fluid, for example, cooling water (LLC) for cooling an engine or the like of an automobile to a cooling target portion of the automobile.

In this specification, a direction parallel to a rotation axis Ax is referred to as the axial direction. A direction along a circumference of a circle about the rotation axis Ax is referred to as a circumferential direction, and a direction parallel to a radius of the circle is referred to as a radial direction. Further, here, a direction on the rotation axis Ax side in the radial direction when viewed from a certain member is referred to as a radial inner side, and a direction opposite to the rotation axis Ax is referred to as a radial outer side.

The electric pump includes a cylindrical stator (not shown) that generates a magnetic field, a rotor 100 (electric pump rotor) arranged on the radial inner side of the stator, a shaft (not shown) that penetrates the rotor 100 in the axial direction, and a housing (not shown) that accommodates the stator, the rotor 100, and the shaft therein and rotatably supports both ends of the shaft. The rotor 100 rotates about the shaft integrally with a portion including a blade portion 42 by the magnetic field generated by the stator. The electric pump is a device that, by the rotation of the blade portion 42, suctions the working fluid present on an IN side to the blade portion 42 and discharges the working fluid to an OUT side.

(2) DETAILED CONFIGURATION OF ROTOR

Figure 3:
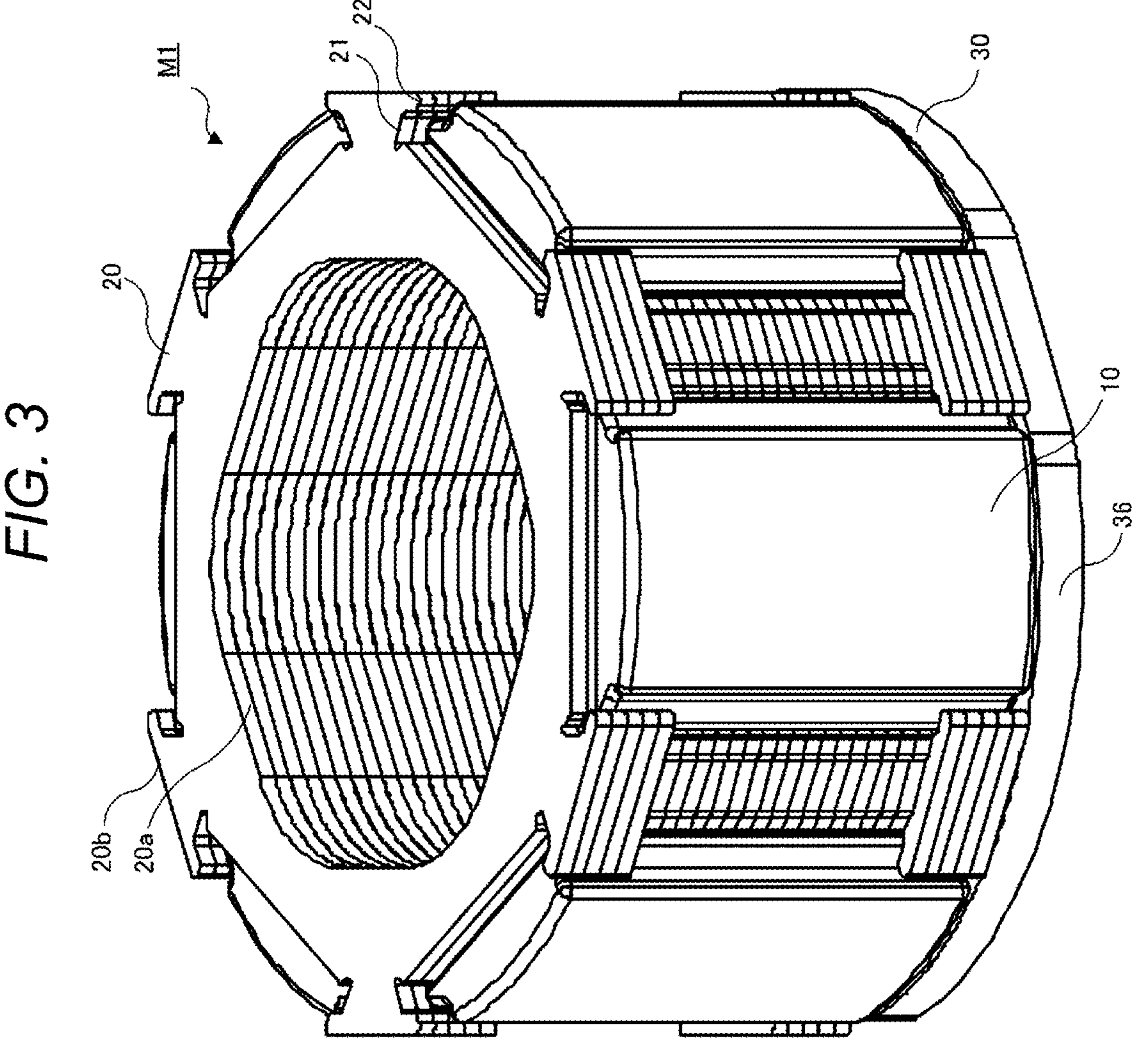
FIG. 3 is a perspective view of a permanent magnet module.
Figure 4A:
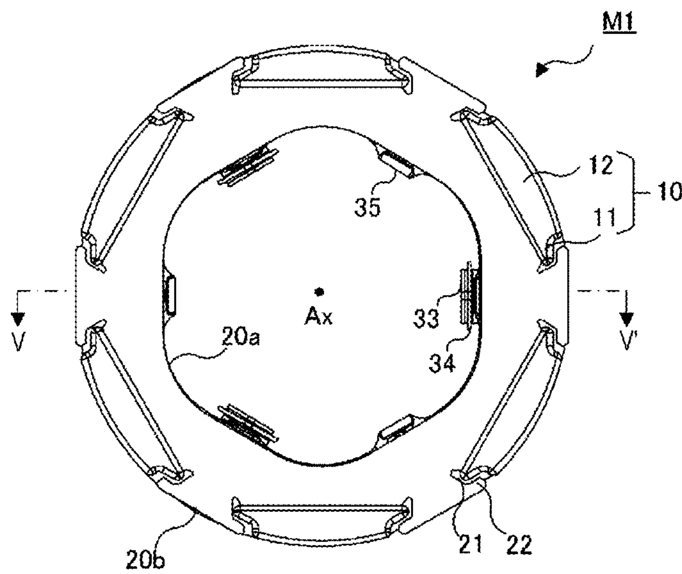
FIG. 4A is a view of the permanent magnet module when viewed from one side in an axial direction.
Figure 4B:
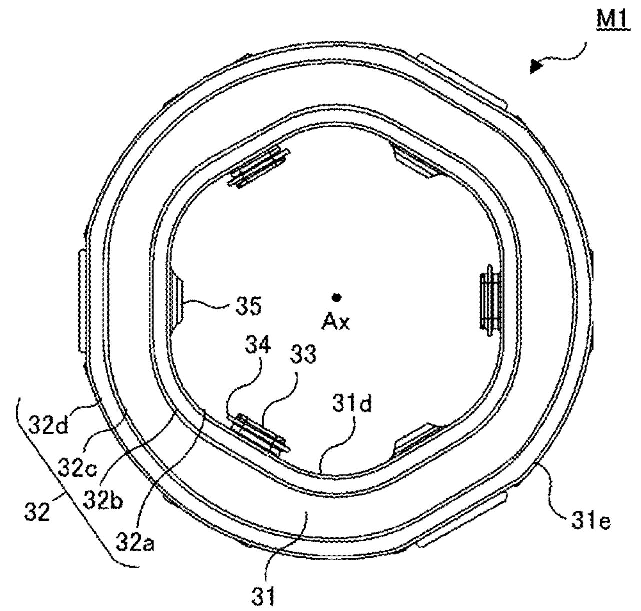
FIG. 4B is a view of the permanent magnet module when viewed from the other side in the axial direction.
Figure 5:
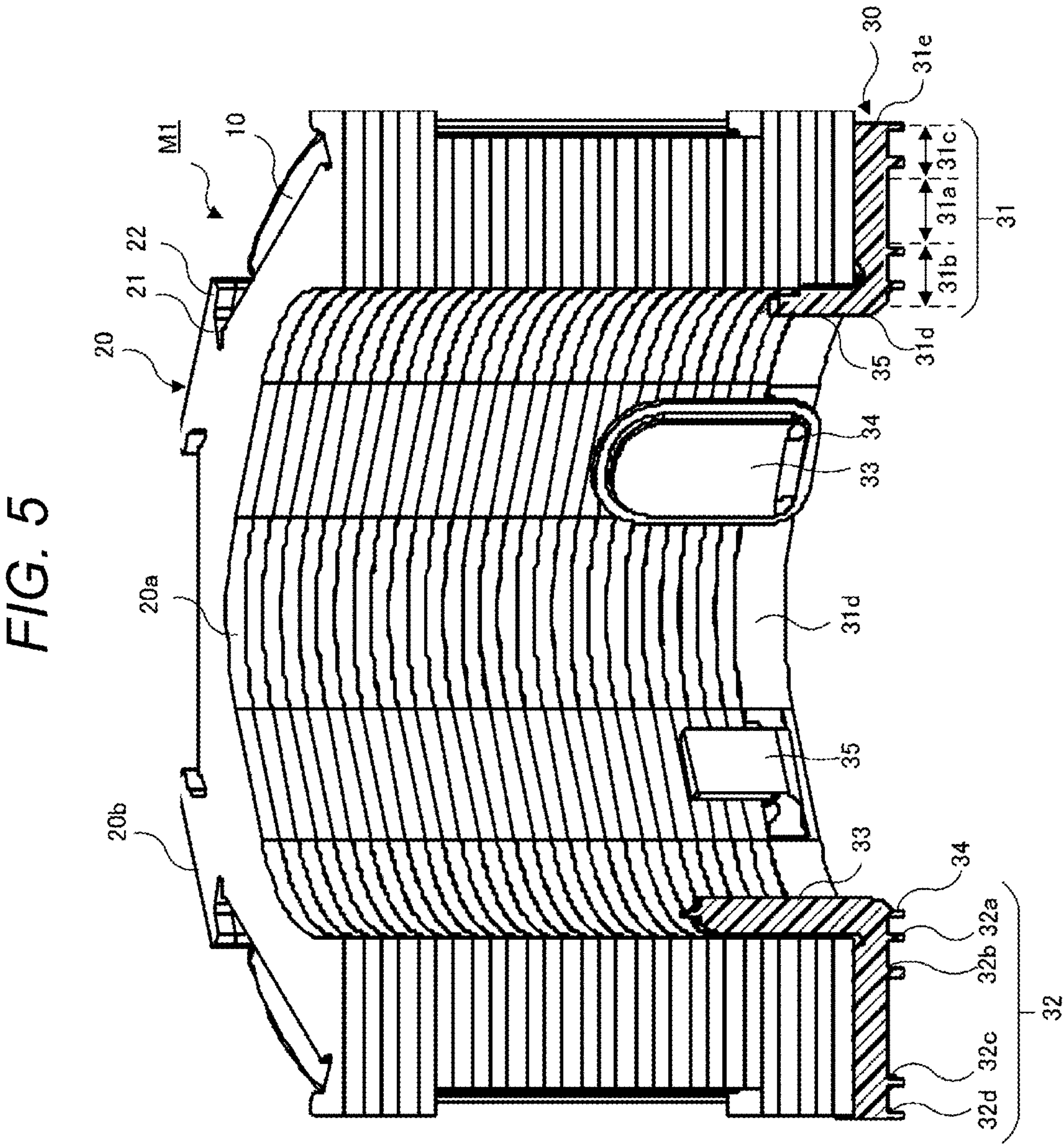
FIG. 5 is a cross-sectional view of the permanent magnet module taken along a line V-V'.
Figure 6A:
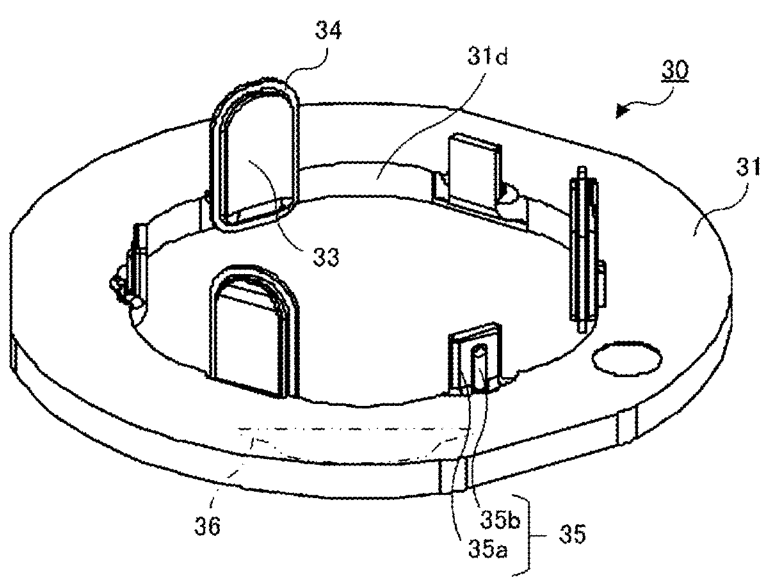
FIGS. 6A and 6B are perspective views of an adjacent member.
Figure 6B:
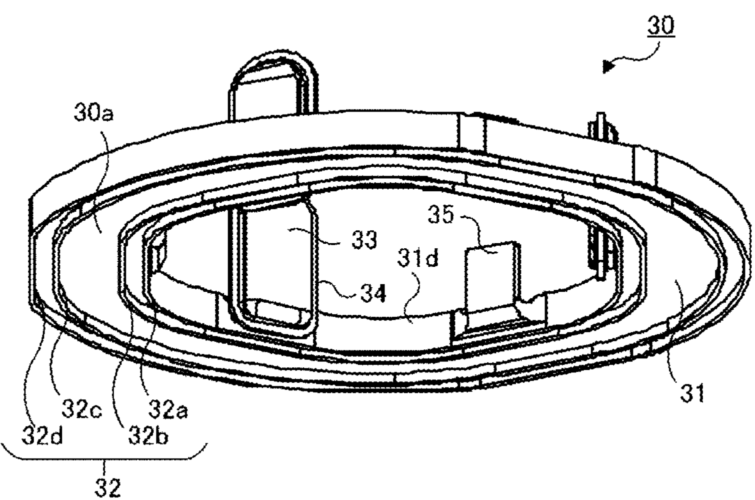

FIG. 3 is a perspective view of a permanent magnet module according to the present embodiment. FIG. 4A is a view of the permanent magnet module according to the present embodiment when viewed from one side in the axial direction, and FIG. 4B is a view of the permanent magnet module according to the present embodiment when viewed from the other side in the axial direction. FIG. 5 is a cross-sectional view of the permanent magnet module according to the present embodiment taken along a line V-V'. In FIG. 5, hatching of a rotor core 20 is omitted for the sake of clarity. FIG. 6A is a perspective view of an adjacent member according to the present embodiment when viewed from the other side in the axial direction, and FIG. 6B is a perspective view of the adjacent member according to the present embodiment when viewed from the one side in the axial direction.

As shown in FIGS. 1B and 2, the rotor 100 includes a permanent magnet 10, the rotor core 20, an adjacent member 30, and a resin molded portion 40. The permanent magnet 10, the rotor core 20, and the adjacent member 30 are integrated to form a permanent magnet module M1.

The permanent magnet 10 is formed of a hard magnetic material, and retains a magnetic force for a long time by being magnetized. The permanent magnet 10 is a substantially rectangular parallelepiped whose length in the axial direction is longer than a length in the circumferential direction, and a shape of a cross section in a direction perpendicular to the axial direction is the same over the entire length in the axial direction. As shown in FIG. 4A, the permanent magnet 10 has a portion 11 formed to be thin in the radial direction at both end portions in the circumferential direction, and a portion 12 formed to be relatively thick in the radial direction and formed to be longer in the circumferential direction than the portion 11 formed to be thin. The portion 11 formed to be thin and an end surface on the radial inner side of the portion 12 formed to be thick are formed in a planar shape, and an end surface on the radial outer side of the portion 12 formed to be thick is formed in an arc shape along an outer diameter portion 20*b* of the rotor core 20.

As shown in FIGS. 3 and 4A, the rotor core 20 is formed in a cylindrical shape and holds the permanent magnet. The rotor core 20 is formed of a material obtained by laminating electromagnetic steel sheets such as silicon steel sheets which are soft magnetic materials. The electromagnetic steel sheet generally has high magnetic permeability, and an eddy current loss can be prevented by forming the electromagnetic steel sheets into a laminated structure. The rotor core 20 includes an arrangement portion 21 and a projecting portion 22. A plurality of arrangement portions 21 are portions which are arranged in the circumferential direction on the outer diameter portion 20*b* forming a surface of the cylindrical rotor core 20 on the radial outer side, and in which a plurality of permanent magnets 10 are arranged. For example, six arrangement portions 21 are arranged at equal intervals (intervals of 60 degrees) in the circumferential direction on the outer diameter portion 20*b*, and six permanent magnets 10 are disposed in the respective arrangement portions 21. The arrangement portion 21 has an opening through which the permanent magnet 10 can be inserted and removed in the axial direction from an end portion on the one side in the axial direction and an end portion on the other side in the axial direction in a single state of the rotor core 20. The arrangement portion 21 is a recessed portion recessed from the outer diameter portion 20*b* of the rotor core 20, and a surface of the recessed portion on the radial inner side is formed as a flat surface. In the arrangement portion 21 and the projecting portion 22, a predetermined clearance is provided between the arrangement portion 21 and the projecting portion 22 and the permanent magnet 10, so that the permanent magnet 10 can be inserted and removed in the axial direction. Although it has been described that the rotor core 20 is formed in a cylindrical shape, the cylindrical shape here widely includes a shape in which a hole is formed on the radial inner side of the electromagnetic steel sheets constituting the rotor core 20, the electromagnetic steel sheets are laminated in the axial direction, and the same shape is continuous in the axial direction. An inner diameter portion 20*a* and the outer diameter portion 20*b* do not need to be strictly annular in the direction perpendicular to the axial direction.

The projecting portions 22 are portions projecting in the circumferential direction facing each other on the radial outer side of each of the plurality of permanent magnets 10 at both ends of each of the plurality of arrangement portions 21 in the circumferential direction. Facing each other means that the pair of projecting portions 22 at both ends of each of the plurality of arrangement portions 21 face each other in the circumferential direction. The projecting portions 22 are portions that hold the portion 11 formed to be thin of the permanent magnet 10 at both ends of each of the plurality of arrangement portions 21 in the circumferential direction. That is, it can be said that the projecting portions 22 are provided at both ends in the circumferential direction and have overlapping portions that at least partially overlap the permanent magnets 10 when viewed from the radial direction. The projecting portions 22 are portions where the outer diameter portion 20*b* of the rotor core 20 protrudes in the circumferential direction on the radial outer side of each of the plurality of permanent magnets 10 at both ends of each of the plurality of arrangement portions 21 in the circumferential direction. A gap is formed between the projecting portion 22 and a surface of the arrangement portion 21 on the radial inner side. The portion 11 formed to be thin of the permanent magnet 10 is inserted into the gap. The provision of the projecting portion 22 can prevent the permanent magnet 10 from falling off in the radial direction in the state of the permanent magnet module M1.

The adjacent member 30 is provided adjacent to the one side in the axial direction of the permanent magnet 10 and the rotor core 20. The adjacent member 30 is formed of resin, and as shown in FIGS. 6A and 6B, includes a closed surface portion 31, a first entire circumference protrusion portion 32, a positioning portion 33, a second entire circumference protrusion portion 34, a press-fit protrusion portion 35, and an overlapping portion 36.

The closed surface portion 31 is formed in an annular flat plate shape having a constant thickness in the axial direction and a predetermined width in the radial direction. The closed surface portion 31 includes a portion 31*a*, an inner extending portion 31*b*, and an outer extending portion 31*c*. The portion 31*a*, the inner extending portion 31*b*, and the outer extending portion 31$c$ are portions present over the entire circumference of the closed surface portion 31 in the circumferential direction, and are present in an order of 31$b$, 31$a$, and 31$c$ from the radial inner side. The portion 31$a$ is a portion that closes the other side in the axial direction of an entire circumference hole portion H1 formed over the entire circumference in the circumferential direction at an end portion 41$a$ of a drive unit 41 on the one side in the axial direction. The inner extending portion 31$b$ is a portion extending on the radial inner side continuously from the portion 31$a$. The outer extending portion 31$c$ is a portion extending on the radial outer side continuously from the portion 31$a$.

The first entire circumference protrusion portion 32 is formed on each of the inner extending portion 31$b$ and the outer extending portion 31$c$ over the entire circumference in the circumferential direction toward the one side in the axial direction, and is welded to the resin molded portion 40. At least two first entire circumference protrusion portions 32 are formed on each of the inner extending portion 31$b$ and the outer extending portion 31$c$. That is, the first entire circumference protrusion portion 32 includes a small-diameter inner protrusion portion 32$a$ formed on the inner extending portion 31$b$, a large-diameter inner protrusion portion 32$b$ formed on the inner extending portion 31$b$ and having a larger diameter than the small-diameter inner protrusion portion 32$a$, a small-diameter outer protrusion portion 32$c$ formed on the outer extending portion 31$c$, and a large-diameter outer protrusion portion 32$d$ formed on the outer extending portion 31$c$ and having a larger diameter than the small-diameter outer protrusion portion 32$c$. In the present embodiment, 32$a$ to 32$d$ of the first entire circumference protrusion portion 32 extend toward the one side in the axial direction, are formed to have a constant length in the axial direction and a constant thickness in the radial direction without any break over the entire circumference in the circumferential direction. A vicinity of a tip end portion of the first entire circumference protrusion portion 32 is melted by heat and pressure related to the resin molding of the resin molded portion 40, and the first entire circumference protrusion portion 32 is welded to the resin molded portion 40 when the resin is solidified, thereby sealing a joint portion between the resin molded portion 40 and the inner extending portion 31$b$ and the outer extending portion 31$c$. Accordingly, it is possible to prevent the working fluid from entering the inside of the drive unit 41 through the entire circumference hole portion H1.

Here, with reference to FIGS. 2 and 5, a reason why the two first entire circumference protrusion portions 32 are formed in each of the inner extending portion 31$b$ and the outer extending portion 31$c$ will be described. In the present embodiment, since the rotor core 20 is formed of metal and the resin molded portion 40 is formed of resin, there is a difference in linear expansion coefficient. The entire circumference hole portion H1 is provided at the end portion 41$a$ of the drive unit 41 on the one side in the axial direction. Therefore, particularly at a low temperature (for example, −40° C.), a thermal stress is generated in a direction in which the resin contracts and opens up the entire circumference hole portion H1, that is, portions on the radial inner side and the radial outer side of the entire circumference hole portion H1 at the end portion 41$a$ of the drive unit 41 on the one side in the axial direction are pulled to the radial inner side and the radial outer side of the entire circumference hole portion H1, respectively. Therefore, when one first entire circumference protrusion portion 32 is formed in each of the inner extending portion 31$b$ and the outer extending portion 31$c$, the thermal stress is concentrated on the protrusion portions, and thus it is necessary to set an allowable thermal stress of the protrusion portions to be high. In the present embodiment, since the two first entire circumference protrusion portions 32 are formed in each of the inner extending portion 31$b$ and the outer extending portion 31$c$, the thermal stress can be dispersed to the two first entire circumference protrusion portions 32, and thus the allowable thermal stress of each of the first entire circumference protrusion portions 32 can be set to be relatively low. Even if the small-diameter inner protrusion portion 32$a$ and the large-diameter outer protrusion portion 32$d$, which are subject to large thermal stress at a low temperature, are broken, a welded state can be maintained by the large-diameter inner protrusion portion 32$b$ and the small-diameter outer protrusion portion 32$c$, and a sealing property can be maintained. Accordingly, the first entire circumference protrusion portion 32 can function as a fail-safe.

A plurality of positioning portions 33 are formed to be separated from one another in the circumferential direction, and are used for positioning the adjacent member 30 in the radial direction with respect to a mold for molding the resin molded portion 40. For example, three positioning portions 33 are arranged at equal intervals (intervals of 120 degrees) in the circumferential direction on an inner diameter portion 31$d$ forming a surface of the closed surface portion 31 on the radial inner side. As shown in FIG. 4B, the inner diameter portion 31$d$ of the closed surface portion 31 is formed in a substantially hexagonal shape when viewed from the axial direction. An outer diameter portion 31$e$ of the closed surface portion 31 is formed in a substantially annular shape when viewed from the axial direction. The positioning portions 33 are formed at linear portions of the substantially hexagonal shape of the inner diameter portion 31$d$ of the closed surface portion 31. The positioning portion 33 is formed to protrude toward the radial inner side from the inner diameter portion 31$d$ of the closed surface portion 31. The positioning portion 33 extends from the inner diameter portion 31$d$ of the closed surface portion 31 toward the other side in the axial direction by a predetermined distance, and has a positioning surface which is a flat surface abutting on the mold on an inner diameter side of an extending portion. The positioning portion 33 does not need to be press-fitted into the inner diameter portion 20$a$ of the rotor core 20, and may have a predetermined clearance between an outer diameter side of the extending portion and the inner diameter portion 20$a$ of the rotor core 20.

The second entire circumference protrusion portion 34 is formed over the entire outer circumference of each of the plurality of positioning portions 33 (positioning surfaces) on a surface perpendicular to the radial direction, and is welded to the resin molded portion 40. The second entire circumference protrusion portion 34 is formed to be thinner in the radial direction than the positioning portion 33 at a center position of the thickness of the positioning portion 33 in the radial direction, and is covered by the resin molded portion 40. In the present embodiment, the second entire circumference protrusion portion 34 extends straight radially from an outer circumferential edge of the positioning portion 33 in the surface perpendicular to the radial direction, and is formed to have a constant length and thickness without any break over the entire outer circumference of the positioning portion 33. A vicinity of a tip end portion of the second entire circumference protrusion portion 34 is melted by the heat and the pressure related to the resin molding of the resin molded portion 40, and the second entire circumference protrusion portion 34 is welded to the resin molded portion 40 when the resin is solidified, thereby sealing a joint portion between the positioning portions 33 of the adjacent member 30 and the resin molded portion 40. Accordingly, it is possible to prevent the working fluid from entering the inside of the drive unit 41 through a gap between the positioning portion 33 and the resin molded portion 40.

A plurality of press-fit protrusion portions 35 are formed separated from each other in the circumferential direction, and are press-fitted into the inner diameter portion 20*a* forming the surface of the cylindrical rotor core 20 on the radial inner side. For example, three press-fit protrusion portions 35 are arranged at equal intervals (intervals of 120 degrees) in the circumferential direction on the inner diameter portion 31*d* of the closed surface portion 31. The press-fit protrusion portions 35 are formed on the linear portions of the cross-sectional substantially hexagonal shape in the inner diameter portion 31*d* of the closed surface portion 31. The positioning portions 33 and the press-fit protrusion portions 35 are alternately arranged in the circumferential direction. As shown in FIG. 6A, the press-fit protrusion portion 35 includes a flat plate portion 35*a* and a crushed portion 35*b*. The flat plate portion 35*a* is a flat plate-shaped portion extending from the closed surface portion 31 toward the other side in the axial direction by a predetermined distance, the radial direction is the thickness direction of the closed surface portion 31, and the direction perpendicular to the radial direction is parallel to a flat plate-shaped surface of the closed surface portion 31. The crushed portion 35*b* is a portion that is provided adjacent to the radial outer side of the flat plate portion 35*a*, extends in the axial direction, bulges toward the radial outer side in a semicircular rod shape, and is crushed when being press-fitted into the inner diameter portion 20*a* of the rotor core 20. By press-fitting the press-fit protrusion portions 35 into the inner diameter portion 20*a* of the rotor core 20, the rotor core 20 and the adjacent member 30 can be easily coupled. In addition, since the rotor core 20 and the adjacent member 30 are coupled to each other, it is possible to prevent the rotor core 20 and the adjacent member 30 from falling off when the permanent magnet module M1 is transported or the like.

As shown in FIGS. 3 and 6A, the overlapping portion 36 is provided on the one side in the axial direction of the permanent magnet 10 and at least partially overlaps the permanent magnet 10 when viewed from the axial direction. The overlapping portion 36 can also be referred to as a projecting portion that projects in the radial direction on the one side in the axial direction of each of the plurality of permanent magnets 10 arranged in each of the plurality of arrangement portions 21. A plurality of overlapping portions 36 are arranged at equal intervals (intervals of 120 degrees) in the circumferential direction corresponding to the plurality of permanent magnets 10. In the present embodiment, each of the overlapping portions 36 has a portion overlapping the entire permanent magnet 10 when viewed from the axial direction. In FIG. 6A, only one of the plurality of overlapping portions 36 is shown. The provision of the overlapping portion 36 can prevent the permanent magnet 10 from falling off in the axial direction in the state of the permanent magnet module M1.

In the resin molded portion 40, the drive unit 41 that covers the permanent magnet 10, the rotor core 20, and the adjacent member 30 and the blade portion 42 that pressure-feeds the working fluid are integrally formed by resin molding.

As shown in FIGS. 1A, 1B, and 2, the drive unit 41 of the resin molded portion 40 covers the permanent magnet module M1 including the permanent magnet 10, the rotor core 20, and the adjacent member 30 from the outside (all directions of the radial inner side, the radial outer side, the one side in the axial direction, and the other side in the axial direction), and only the closed portion 31*a* of the closed surface portion 31 of the adjacent member 30 and the positioning surface of the positioning portion 33 are exposed from the drive unit 41. The blade portion 42 of the resin molded portion 40 is also referred to as an impeller portion. The blade portion 42 includes an eaves portion 42*a* and a plurality of blades 42*b*. The eaves portion 42*a* is provided on the other side in the axial direction of the drive unit 41 via a connection portion 43 having a diameter smaller than that of the drive unit 41, and is formed to have a larger diameter than the drive unit 41 and the connection portion 43. The plurality of blades 42*b* extend to the other side in the axial direction of the eaves portion 42*a* and are formed in a spiral shape. The plurality of blades 42*b* are formed such that the length thereof in the axial direction decreases toward the radial outer side. In the resin molded portion 40, the drive unit 41 and the blade portion 42 of the resin molded portion 40 are integrally formed of resin in a state where the permanent magnet module M1 and a bearing 50 into which the shaft (not shown) of the rotor 100 is inserted are placed in the mold as insert components. As shown in FIG. 2, the bearing 50 is formed in a cylindrical shape, and a central axis of the cylinder coincides with the rotation axis Ax. The bearing 50 is disposed on the radial inner side of the resin molded portion 40 and extends in the axial direction over substantially the entire region of the resin molded portion 40 in the axial direction. The bearing 50 is formed of, for example, sintered carbon, but may also be formed of metal, resin, or the like.

(3) METHOD FOR MANUFACTURING ROTOR

FIG. 7 is a flowchart showing a method of manufacturing the electric pump rotor according to the present embodiment. First, the permanent magnet 10, the rotor core 20, and the adjacent member 30 are separately manufactured in advance. In step S100, the press-fit protrusion portions 35 of the adjacent member 30 are press-fitted into the inner diameter portion 20*a* of the rotor core 20 (press-fitting step). Specifically, the press-fit protrusion portions 35 are press-fitted into the inner diameter portion 20*a* of the rotor core 20 until the end surface of the rotor core 20 on the one side in the axial direction and the end surface of the adjacent member 30 on the other side in the axial direction come into contact with each other while crushing the crushed portion 35*b* of the press-fit protrusion portion 35.

Next, in step S110, the permanent magnet 10 is slidably inserted into the arrangement portion 21 of the rotor core 20 from the opening on the other side in the axial direction of the arrangement portion 21 toward the one side in the axial direction (insertion step). When inserted, the permanent magnet 10 comes into contact with the overlapping portion 36 of the adjacent member 30. In this state, the permanent magnet module M1 including the permanent magnet 10, the rotor core 20, and the adjacent member 30 is completed.

Subsequently, in step S120, the permanent magnet module M1 and the bearing 50 are placed on a mold (placing step). The mold is provided with a whole circumferential convex portion, three standing portions, and a support portion. The whole circumferential convex portion is a portion that is formed in a substantially hexagonal shape over the entire circumference in the circumferential direction and supports an end portion 30*a* (the portion 31*a* of the closed surface portion 31) on the one side in the axial direction of the adjacent member 30 from one side in the axial direction. Accordingly, the permanent magnet module M1 is positioned in the axial direction. The three standing portions are portions that extend toward the other side in the axial direction and stand in a state of being arranged at equal intervals (intervals of 120 degrees) in the circumferential direction. The three standing portions extend by a predetermined distance in the circumferential direction, and have at least a length in the circumferential direction of the positioning portion 33 of the adjacent member 30. The three standing portions are located between the positioning portion 33 of the adjacent member 30 and an outer peripheral surface of the bearing 50. The standing portions come into contact with the positioning surface of the positioning portions 33 of the adjacent member 30. Accordingly, the permanent magnet module M1 is positioned in the radial direction. The support portion is a portion that is provided in a vicinity of a base on the one side in the axial direction of the standing portion, and supports an end portion 50*a* on the one side in the axial direction of the bearing 50. The bearing 50 is positioned in the axial direction by supporting the end portion 50*a* on the one side in the axial direction of the bearing 50 by the support portion, and the bearing 50 is positioned in the radial direction by supporting the outer peripheral surface of the bearing 50 by the three standing portions.

Then, in step S130, resin is poured into the mold from an end portion on the other side in the axial direction of the mold to perform resin molding (resin molding step). By performing resin molding in a state in which the end portion 30*a* of the adjacent member 30 on the one side in the axial direction is supported by the whole circumferential convex portion of the mold, the entire circumference hole portion H1 is formed in the end portion 41*a* of the drive unit 41 on the one side in the axial direction. Details will be described later. By performing resin molding in a state in which the positioning portion 33 of the adjacent member 30, the end portion 50*a* on the one side in the axial direction of the bearing 50, and the outer peripheral surface of the bearing 50 are supported by the standing portion of the mold, cavity portions 101 extending in the axial direction are formed on the radial inner side of the three positioning portions 33 arranged in the circumferential direction, and coupling portions 102 extending in the axial direction are formed on the radial inner side of the three press-fit protrusion portions 35 arranged in the circumferential direction, in which the resin molded portion 40 and the bearing 50 are coupled to each other. Therefore, the positioning surface of the positioning portion 33 is exposed to the cavity portions 101 (outside of the resin molded portion), and the press-fit protrusion portion 35 is included in the coupling portion 102 (inside of the resin molded portion). Therefore, the positioning portion 33 is provided with the second entire circumference protrusion portion 34, whereas the press-fit protrusion portion 35 is not provided with such an entire circumference protrusion portion.

Finally, in step S140, the rotor 100 is removed from the mold. A magnetizing device in the next step is provided with at least one pin protruding from a pedestal thereof to the other side in the axial direction. The rotor 100 (the rotational position of the permanent magnet 10) is positioned by rotating the rotor 100 in the circumferential direction and fitting at least one pin into a plurality of (for example, three) hole portions H2 provided in the end portion 41*a* on the one side in the axial direction of the drive unit 41, and an object having a magnetic field such as a coil is brought close to the permanent magnet 10 from the radial outer side of the drive unit 41 to magnetize the permanent magnet 10 to N poles and S poles (magnetization step).

Here, a reason why some kind of hole portion is provided in the end portion 41*a* on the one side in the axial direction of the drive unit 41 is (a) to support the permanent magnet module M1 including the permanent magnet 10, the rotor core 20, and the adjacent member 30 from the one side in the axial direction of the adjacent member 30 at the time of resin molding. A reason why a hole portion H2 is provided in the end portion 41*a* on the one side in the axial direction of the drive unit 41 is (b) to use the hole portion H2 for positioning the rotor 100 (the rotational position of the permanent magnet 10) before magnetization is performed. For this reason, if only the hole portion H2 is provided, the functions (a) and (b) can be performed.

Further, a reason why the entire circumference hole portion H1 is provided in the end portion 41*a* on the one side in the axial direction of the drive unit 41 in addition to the hole portion H2 is that (c) if the entire circumference hole portion H1 is not provided, as shown in FIG. 2, the resin flowing from the other side in the axial direction is divided and flows to the inner diameter portion 20*a* side (arrow D) and the outer diameter portion 20*b* side (arrow E) of the rotor core 20, a joining position where the resins join again is generated, a weld line is inevitably generated, and when the weld line overlaps a position where high stress is generated, a possibility that a product defect occurs increases. Therefore, by providing the entire circumference hole portion H1 in the end portion 41*a* on the one side in the axial direction of the drive unit 41, a division structure in which the resin flowing separately to the inner diameter portion 20*a* side and the outer diameter portion 20*b* side of the rotor core 20 does not join together is provided. For example, as the position where the high stress is generated, a C portion shown in FIGS. 1B and 2, which is an end edge portion on the one side in the axial direction of the permanent magnet 10, is assumed, and when the joining position (weld line) of the resin coincides with the C portion which is the end edge portion on the one side in the axial direction of the permanent magnet 10, a product defect may occur. For the above reason, the entire circumference hole portion H1 is provided in the end portion 41*a* on the one side in the axial direction of the drive unit 41.

In the present embodiment, the first entire circumference protrusion portion 32, which is formed over the entire circumference in the circumferential direction toward the one side in the axial direction in each of the inner extending portion 31*b* and the outer extending portion 31*c* of the adjacent member 30 and is welded to the resin molded portion 40, is provided to prevent the working fluid from entering the drive unit 41 through the entire circumference hole portion H1. Accordingly, a problem that may occur due to the integral molding, that is, a problem that the working fluid infiltrates into the drive unit 41 from the portion supported by the whole circumferential convex portion of the mold during the resin molding is solved, and thus it is possible to provide the integrally molded rotor 100. Since the rotor 100 can be integrally molded with resin, productivity in resin molding can be improved and a cost can be reduced as compared with a case where the resin molding is performed a plurality of times.

(4) OTHER EMBODIMENTS

The above embodiment is an example of carrying out this disclosure, and various other embodiments can be adopted. For example, the number of permanent magnets 10 and arrangement portions 21 is not limited to six, and may be another number. In addition, the permanent magnet 10 and the arrangement portion 21 may have various shapes and sizes. A medium pressure-fed by the blade portion 42 of the rotor 100 may be any working fluid, and is not limited to cooling water or the like. Further, an order of the replaceable steps in the method for manufacturing a rotor may be changed. For example, in the manufacturing method shown in FIG. 7, an order of S110 and S120 may be changed.

The entire circumference hole portion H1 being formed over the entire circumference in the circumferential direction includes a case of being formed continuously in the circumferential direction and a case of being formed discontinuously in the circumferential direction. The term "discontinuously" means a state in which the inner diameter side and the outer diameter side of the entire circumference hole portion H1 are partially connected. When formed continuously in the circumferential direction, it is possible to obtain a divided structure in which the resin flowing separately to the inner diameter portion 20*a* side and the outer diameter portion 20*b* side of the rotor core 20 does not join together, it is possible to eliminate the occurrence of the weld line, and it is possible to reliably prevent product defects due to the weld line overlapping a portion where a large stress is generated. On the other hand, the weld line may be formed discontinuously in the circumferential direction of the entire circumference hole portion H1 as long as the weld line does not overlap the portion where the large stress is generated and the generation of the weld line is allowable.

The drive unit 41 and the blade portion 42 being integrally formed by resin molding means that the drive unit 41 and the blade portion 42 are formed in a state of being connected by one time of resin molding. For this reason, a case where the drive unit 41 and the blade portion 42 are separately formed by resin molding and are joined to each other, a case where one of the drive unit 41 and the blade portion 42 is formed by resin molding and then the other of the drive unit 41 and the blade portion 42 is integrally formed by resin molding in a state where the drive unit 41 and the blade portion 42 partially overlap each other, and the like are not included.

The configuration in which the first entire circumference protrusion portion 32 is formed over the entire circumference in the circumferential direction includes a case in which the first entire circumference protrusion portion 32 is formed without any break in the circumferential direction. By being formed without any break in the circumferential direction, it is possible to reliably prevent the working fluid from entering the inside of the drive unit 41 from a portion of the break. Further, the configuration in which the first entire circumference protrusion portion 32 is formed over the entire circumference in the circumferential direction includes a state in which, when the entire circumference hole portion H1 is discontinuously formed in the circumferential direction, the first entire circumference protrusion portion 32 has a plurality of surrounding portions formed so as to surround the entire circumference of each of a plurality of holes constituting the discontinuous entire circumference hole portion H1 or the entire circumference of each of the holes constituting a group, and the plurality of surrounding portions are arranged in the circumferential direction. Since the plurality of surrounding portions are formed so as to surround the entire circumference of each of the plurality of holes constituting the discontinuous entire circumference hole portion H1 or the entire circumference of each of the holes constituting the group, it is possible to prevent the working fluid from entering the inside of the drive unit 41 from each of the discontinuous entire circumference hole portions H1.

The second entire circumference protrusion portion 34 being formed over the entire outer circumference of each of the plurality of positioning portions 33 means that the second entire circumference protrusion portion 34 is formed over the entire outer circumference without any break. By being formed over the entire outer circumference without any break, it is possible to reliably prevent the working fluid from entering the inside of the drive unit 41 from a portion of the break.

The closed portion 31*a* of the closed surface portion 31 is a portion that closes the other side of the entire circumference hole portion H1 in the axial direction, and is a portion that overlaps the entire circumference hole portion H1 when viewed from the axial direction. A reliable seal is not maintained by closing the entire circumference hole portion H1 with the closed surface portion 31, but by the first entire circumference protrusion portion 32.

The rotor core 20 and the adjacent member 30 may have various shapes and sizes. For example, the inner diameter portion 20*a* of the rotor core 20 and the inner diameter portion 31*d* of the closed surface portion 31 of the adjacent member 30 are not limited to substantially hexagonal shapes, and may have other shapes. Although the bearing 50 is insert-molded, the bearing 50 is not an essential configuration.

The number of the positioning portions 33 and the press-fit protrusion portions 35 of the adjacent member 30 is not limited to three, and may be another number. The positioning portion 33 and the press-fit protrusion portion 35 may have various shapes and sizes. If the adjacent member 30 can be positioned in the radial direction by another configuration, the positioning portion 33 is not an essential configuration. The press-fit protrusion portion 35 may not be press-fitted into the inner diameter portion 20*a* of the rotor core 20, and may be press-fitted into another portion, for example, the outer diameter portion 20*b* of the rotor core 20. Further, even if the press-fit protrusion portion 35 is not provided, the press-fit protrusion portion 35 is not an essential configuration as long as the permanent magnet module M1 can be transported without being unraveled when being placed in the mold and is reliably positioned in the mold. When the press-fit protrusion portion 35 is not provided, in the manufacturing method shown in FIG. 7, S100 is a process of simply placing the rotor core 20 on the other side of the adjacent member 30, rather than press-fitting.

The projecting portion 22 of the rotor core 20 does not need to project over the entire region in the axial direction, and may project at least partially to prevent the permanent magnet 10 from falling off in the radial direction. The overlapping portion 36 of the adjacent member 30 does not need to overlap the entire region of the permanent magnet 10 when viewed from the axial direction, and it is sufficient that the overlapping portion 36 overlaps at least a part of the permanent magnet 10 to prevent the permanent magnet 10 from falling off in the axial direction.

The number of the first entire circumference protrusion portions 32 of the adjacent member 30 is not limited to two in the inner extending portion 31*b* and two in the outer extending portion 31*c*, and may be another number as long as one or more are formed in the inner extending portion 31*b* and one or more are formed in the outer extending portion 31*c*. Similarly, a shape and size of the first entire circumference protrusion portion 32 may also be various modes. For example, in consideration of the flow of resin and the degree of welding during resin molding, the shapes of 32*a* to 32*d* shown in FIG. 5 may be tapered toward the tip in advance. In addition, the length in the axial direction and the thickness in the radial direction may be different among 32*a* to 32*d*. Specifically, lengths in the axial direction of the 32*a* on the innermost side in the radial direction and the 32*d* on the outermost side in the radial direction in which a higher thermal stress is generated at a low temperature may be formed to be longer than those of 32*b* and 32*c*. The reverse may be performed.

Similarly, a shape and size of the second entire circumference protrusion portion 34 may also be various modes. The second entire circumference protrusion portion 34 may have a shape tapered toward the tip in advance in consideration of the flow of the resin and the degree of welding during resin molding.

According to an aspect of this disclosure, an electric pump rotor includes: a permanent magnet; a cylindrical rotor core that holds the permanent magnet; an adjacent member that is provided adjacent to one side in an axial direction of the permanent magnet and the rotor core; and a resin molded portion in which a drive unit that covers the permanent magnet, the rotor core, and the adjacent member, and a blade portion that pressure-feeds a working fluid are integrally formed by resin molding. The adjacent member includes a closed surface portion that includes a closed portion that closes the other side in the axial direction of an entire circumference hole portion formed over an entire circumference in a circumferential direction at an end portion of the drive unit on the one side in the axial direction, an inner extending portion that extends toward a radial inner side continuously from the closed portion, and an outer extending portion that extends toward a radial outer side continuously from the closed portion, and a first entire circumference protrusion portion that is formed over the entire circumference in the circumferential direction toward the one side in the axial direction at each of the inner extending portion and the outer extending portion, and is welded to the resin molded portion.

The rotor core is a cylindrical member. Therefore, in order to integrally mold a plurality of members including the rotor core and cover the radial inner side and the radial outer side of the rotor core with resin, it is necessary to have a configuration such that the radial inner side and the radial outer side of the rotor core are not supported by a mold. As an example, it is conceivable that an end portion of the rotor core on the one side in the axial direction is supported by the mold, and resin flows in from an end portion on the other side in the axial direction. In this case, since the rotor core is supported by the mold only at the end portion on the one side in the axial direction, in order to stably support the rotor core, for example, it is conceivable to support the rotor core over the entire circumference in the circumferential direction at the end portion on the one side in the axial direction.

However, when resin molding is performed with such a mold, a portion where the rotor core is supported becomes an entire circumference hole portion over the entire circumference in the circumferential direction. In this case, the working fluid may enter a gap between the resin and the rotor core through the entire circumference hole portion. If the working fluid enters the gap between resin and the rotor core, for example, the rotor core and the permanent magnet may be corroded, making the product unsuitable.

Therefore, in the electric pump rotor, the rotor core, the permanent magnet, and the adjacent member are integrated in the mold, and the adjacent member is supported by the mold. In this case, the other side in the axial direction of the entire circumference hole portion is closed by the end portion on the one side in the axial direction of the adjacent member, but the working fluid may enter the drive unit from the gap between the inner extending portion and the outer extending portion and the resin molded portion via the entire circumference hole portion. Therefore, the first entire circumference protrusion portion is provided in each of the inner extending portion and the outer extending portion to prevent the working fluid from entering the drive unit. According to such a configuration, a problem that may occur due to the integral molding, that is, a problem that the working fluid infiltrates into the drive unit from the portion supported by the support portion of the mold during the resin molding is solved, and thus it is possible to provide an integrally molded rotor. As a result, productivity in resin molding can be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An electric pump rotor, comprising:

a permanent magnet;

a cylindrical rotor core that holds the permanent magnet;

an adjacent member that is provided adjacent to one side in an axial direction of the permanent magnet and the rotor core; and a resin molded portion in which a drive unit that covers the permanent magnet, the rotor core, and the adjacent member, and a blade portion that pressure-feeds a working fluid are integrally formed by resin molding, wherein the adjacent member includes a closed surface portion that includes a closed portion that closes the other side in the axial direction of an entire circumference hole portion formed over an entire circumference in a circumferential direction at an end portion of the drive unit on the one side in the axial direction, an inner extending portion that extends toward a radial inner side continuously from the closed portion, and an outer extending portion that extends toward a radial outer side continuously from the closed portion, and at least one first entire circumference protrusion portion that is formed over the entire circumference in the circumferential direction toward the one side in the axial direction at each of the inner extending portion and the outer extending portion, and is welded to the resin molded portion.

2. The electric pump rotor according to claim 1, wherein at least two of the at least one first entire circumference protrusion portions are formed at each of the inner extending portion and the outer extending portion.

3. The electric pump rotor according to claim 1, wherein the adjacent member further includes:

a plurality of positioning portions that are formed to be separated from one another in the circumferential direction and are used for positioning the adjacent member in a radial direction with respect to a mold for molding the resin molded portion; and a second entire circumference protrusion portion that is formed over an entire outer circumference of each of the plurality of positioning portions on a surface perpendicular to the radial direction and is welded to the resin molded portion.

4. The electric pump rotor according to claim 2, wherein the adjacent member further includes:

a plurality of positioning portions that are formed to be separated from one another in the circumferential direction and are used for positioning the adjacent member in the radial direction with respect to a mold for molding the resin molded portion; and a second entire circumference protrusion portion that is formed over an entire outer circumference of each of the plurality of positioning portions on a surface perpendicular to the radial direction and is welded to the resin molded portion.

5. The electric pump rotor according to claim 1, wherein the rotor core includes:

a plurality of arrangement portions that are arranged in the circumferential direction on an outer diameter portion forming a surface of the cylindrical rotor core on the radial outer side, a plurality of permanent magnets being arranged in the plurality of arrangement portions; and projecting portions that project in the circumferential direction at both ends in the circumferential direction of each of the plurality of arrangement portions and face each other on the radial outer side of each of the plurality of permanent magnets, and the adjacent member further includes:

a plurality of press-fit protrusion portions that are formed separately in the circumferential direction and are press-fitted into an inner diameter portion forming a surface of the cylindrical rotor core on the radial inner side; and an overlapping portion that is provided on the one side in the axial direction of the permanent magnet and at least partially overlaps the permanent magnet when viewed from the axial direction.

6. The electric pump rotor according to claim 2, wherein the rotor core includes:

a plurality of arrangement portions that are arranged in the circumferential direction on an outer diameter portion forming a surface of the cylindrical rotor core on the radial outer side, a plurality of permanent magnets being arranged in the plurality of arrangement portions; and projecting portions that project in the circumferential direction at both ends in the circumferential direction of each of the plurality of arrangement portions and face each other on the radial outer side of each of the plurality of permanent magnets, and the adjacent member further includes:

a plurality of press-fit protrusion portions that are formed separately in the circumferential direction and are press-fitted into an inner diameter portion forming a surface of the cylindrical rotor core on the radial inner side; and an overlapping portion that is provided on the one side in the axial direction of the permanent magnet and at least partially overlaps the permanent magnet when viewed from the axial direction.

* * * * *